US011448602B2

(12) United States Patent
Dalla Casa et al.

(10) Patent No.: US 11,448,602 B2
(45) Date of Patent: Sep. 20, 2022

(54) METHOD FOR CHECKING AN OBJECT MADE OF TRANSPARENT MATERIAL AND CORRESPONDING CHECKING SYSTEM

(71) Applicant: Marposs Societa' Per Azioni, Bentivoglio (IT)

(72) Inventors: Maurizio Dalla Casa, Sarnico (IT); Marco Montecchi, Bracciano (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 1 day.

(21) Appl. No.: 17/053,957

(22) PCT Filed: May 8, 2019

(86) PCT No.: PCT/EP2019/061866
§ 371 (c)(1),
(2) Date: Nov. 9, 2020

(87) PCT Pub. No.: WO2019/215255
PCT Pub. Date: Nov. 14, 2019

(65) Prior Publication Data
US 2021/0239624 A1  Aug. 5, 2021

(30) Foreign Application Priority Data
May 8, 2018 (IT) .................. 102018000005143

(51) Int. Cl.
*G01N 21/90* (2006.01)
*G01B 11/06* (2006.01)
*G01B 11/25* (2006.01)
(52) U.S. Cl.
CPC ............. *G01N 21/90* (2013.01); *G01B 11/06* (2013.01); *G01B 11/2522* (2013.01)

(58) Field of Classification Search
CPC .......... G01B 11/06; G01B 7/08; G01B 7/087; G01B 11/0633; G01B 11/245;
(Continued)

(56) References Cited

U.S. PATENT DOCUMENTS 3,439,178 A * 4/1969 Rottmann ............... B07C 5/126
                                                    250/223 B
6,549,288 B1 * 4/2003 Migdal ................... G06T 7/521
                                                    356/601

(Continued)

FOREIGN PATENT DOCUMENTS

CN       102435618 A      5/2012
CN       102759534 A  *  10/2012
(Continued)

OTHER PUBLICATIONS

Office Action dated Mar. 30, 2022 issued in CN Patent Application No. 201980031028.2.

*Primary Examiner* — Michael P Stafira
(74) *Attorney, Agent, or Firm* — Blank Rome LLP

(57) ABSTRACT

Method for checking the surface and/or shape of at least one surface, or part thereof, of an object made of transparent material, by means of a checking system which comprises a light source, a sensor and a processing unit connected to the sensor. By an appropriate positioning of the light source and sensor it is possible to overcome the problem of multiple reflections and to identify in a unique manner the rays scattered from the surface to be checked and received by the sensor which are useful for the purposes of checking. According to one of the embodiments, it is also possible to determine the thickness of the object to be checked.

16 Claims, 4 Drawing Sheets

(58) Field of Classification Search
CPC . G01B 21/08; G01B 7/28; G01B 5/06; G01B 7/06; G01B 11/0691; G01B 11/14; G01B 11/24; G01B 5/0004; G01B 5/20; G01B 5/207; G01B 7/287; G01B 11/02; G01B 11/08; G01B 15/025; G01B 15/045; G01B 11/026; G01B 11/0625; G01B 15/00; G01B 15/02; G01B 21/06; G01B 5/068; G01B 7/10

See application file for complete search history.

(56) References Cited

U.S. PATENT DOCUMENTS

| | | | | |
|---|---|---|---|---|
| 2006/0006352 | A1* | 1/2006 | Juvinall | G01B 11/06 250/223 B |
| 2006/0098191 | A1* | 5/2006 | Ringlien | G01N 21/90 356/239.4 |
| 2011/0032510 | A1* | 2/2011 | Furnas | G01B 11/06 356/33 |
| 2011/0033103 | A1* | 2/2011 | Furnas | G01L 5/0047 382/141 |
| 2015/0276380 | A1 | 10/2015 | Leconte | |

FOREIGN PATENT DOCUMENTS

| | | | | |
|---|---|---|---|---|
| CN | 102809351 | A | 12/2012 | |
| CN | 102165282 | B * | 7/2013 | ............ G01B 11/06 |
| CN | 103782327 | A | 5/2014 | |
| CN | 104870932 | A | 8/2015 | |
| EP | 1715289 | A1 | 10/2006 | |
| EP | 2284481 | A1 * | 2/2011 | ............ G01B 11/06 |
| EP | 2993464 | A1 * | 3/2016 | ............ G01N 21/90 |
| GB | 1329240 | A | 9/1973 | |
| JP | H06201336 | A * | 7/1994 | |
| JP | 2009186281 | A * | 8/2009 | |
| KR | 101475310 | B1 * | 12/2014 | |
| WO | WO 2004/065902 | A1 | 8/2004 | |

* cited by examiner

METHOD FOR CHECKING AN OBJECT MADE OF TRANSPARENT MATERIAL AND CORRESPONDING CHECKING SYSTEM

TECHNICAL FIELD

The invention relates to a method, and a corresponding system, for checking an object made of transparent material. This method makes it possible to carry out checks on the surface and/or of the shape of at least one surface, or part thereof, of the object, in order to identify irregularities and/or structural defects, for example. According to one embodiment, it is also possible to determine the thickness of the object to be checked.

BACKGROUND ART

There are various known methods for reconstructing the 3D shape of an object. Among contactless methods, 3D laser triangulation scanning is very suitable for measuring objects from a distance of about one metre, with a resolution down to a few microns. According to this known art, not explained in detail here, a laser beam is directed towards the object to be measured, the illuminated surface reflects/scatters part of the incident radiation, and a digital video camera captures the image of the surface of the object comprising the illuminated points.

A method for reconstructing the 3D geometry of an object from 2D images provides for the use of a pinhole model of the video camera as shown in FIG. 1.

Essentially, when the image has been corrected for the distortions created by the lens, a light ray scattered from the surface of the object passes through the lens centre of the video camera and finally strikes an image sensor (typically a CCD/CMOS) of the video camera. For convenience, the sensor is placed before the lens centre in the figure. Therefore, when the following are known:
 the geometrical plane or straight line on which the laser beam/blade lies
 the position of the lens centre
 the orientation of the camera (yaw, pitch, roll)
 the focal length of the lens
 the principal point of the sensor,
the calculation of the position of the point P on the surface of the object from which the scattered light ray that struck pixel i,j of the image sensor departed is reduced to a simple geometrical problem with a solution that is unique and immediate (and therefore requires no iterative calculation).

The distortions of the image may be corrected once the characteristic matrix, the coefficients of distortion and the principal point of the camera are known; all these parameters may be evaluated using one of the methods described in the literature, after the selection of the appropriate combination of video camera and lens for the requirements of the measurement.

This method is currently well accepted for the measurement of opaque objects, but its use is strongly discouraged for transparent objects, owing to refraction and reflection phenomena that generate false traces at the first surface, that is to say the surface facing the light emitter, of the object to be checked. For example, in the case of a glass plate, in addition to a first trace due to the intersection of the laser with the first surface of the glass, that is to say the surface facing the light source, a second trace will appear, due to the second surface of the glass, that is to say the opposite surface, the one not facing the light source. Moreover, in the case of transparent hollow objects such as containers, there are additional reflections/scatterings generated by the wall of the container opposite the wall which is being checked and towards which the light rays are directed. This makes the conventional triangulation methods ineffective. Indeed, even if the check relates to a container rather than a plate, in a similar way some of the light striking the outer surface of the container is transmitted through the transparent material until it strikes the second surface (inside the container) where a further reflection takes place.

In addition to the systems described above for obtaining measurements relating to the shape of the profile of the outer surface of the container, the most widespread systems currently in use are listed below.

Reconstruction of the shape of the profile of the container by using electromechanical sensors which make a point contact with the outer surface of the container in different positions. The container is then placed on a rotating support and the readings of the electromechanical sensors, connected to a processing system which relates sensor readings and the angular position of the container to each other, may be used to reconstruct the shape error in the various positions.

Use of coordinate measuring systems equipped with mechanical feelers, or optical measurement heads (contactless). These systems, well known in the use of both industrial and laboratory metrology, may also provide for the use of micropowders to be applied to the outer surface of the container to facilitate the identification of the illuminated points by optical measurement heads.

Use of optical systems which detect the outer profile of the container (shadow projection systems). Such systems usually read the "outline" of the container, that is to say its "shadow" on an appropriate background. The camera takes photographs of the outer edge of the container at different angular positions, reconstructing their topology by analysing the large number of images collected. However, these systems cannot detect errors of "negative" shape, that is to say "depressions".

Use of mechanical gauges, which, when rested against the outer surface of the container, can be used to provide, by means of a mechanical comparator, information on the profile error of containers having cylindrical nominal outer surfaces.

In principle, when the geometry of the system, that is to say the relative positions of the object, the receiver (video camera) and the light source, and the direction of light emission are known, together with the refractive characteristics of the material forming the object to be checked, the analysis of the images reflected on the two transition surfaces (outer and inner) could be used to make not only a 3D measurement of the container but also a measurement of the thickness of the material forming the container, by measuring the distance between the two reflected traces. However, especially where an inner surface of a container, that is to say an object of hollow shape, is to be checked, multiple reflection/scattering and refraction phenomena have hitherto impeded the application of the method described above, since it is very difficult, when using the known methods, to distinguish the actual reflected/scattered images of the light source from parasitic images generated by the multiple reflection/scattering phenomena.

There are various other methods for making such a measurement by means of sensors which make a point measurement of the thickness. Such sensors, when appropriately connected to positioning and movement systems and/or combined in arrays, may measure the thickness at a multiplicity of points either by scanning or by acquiring numerous point traces. Such point sensors may be, for example, capacitive, chromatic confocal, or magnetic sensors. However, the use of these sensors requires the scanning of the object to be measured along repeated paths in different positions, so that the performance and completion of such scans is very time-consuming.

DESCRIPTION OF THE INVENTION

The object of the present invention is to provide a method and a corresponding system for the contactless checking of at least one flat and/or curved surface made of transparent material which overcomes the drawbacks of the known methods and allows optical triangulation to be applied to transparent objects.

The system and method according to the invention may also be used to check and measure shape errors (profile errors) of the surface of an object made of glass or other transparent material. In the specific case of a container, it is possible, for example, to check the areas to which the label is applied at the end of the filling process, or in which a surface decoration is formed.

According to one of the embodiments of the invention, it is also possible to check the thickness of a plate and/or of a hollow body of transparent material, for example a container.

BRIEF DESCRIPTION OF THE DRAWINGS

The invention will now be described in detail with reference to embodiments illustrated in the attached drawings, which are to be interpreted as non-limiting examples, in which.

BEST MODE FOR CARRYING OUT THE INVENTION

A checking system 1 and a corresponding method are described below with reference to a container made of glass, more particularly a bottle. However, these may be applied to the checking of any object of transparent material comprising at least a first and a second surface, which may be either flat or curved, delimiting a thickness, for example flat objects such as glass plates.

Figure 2:
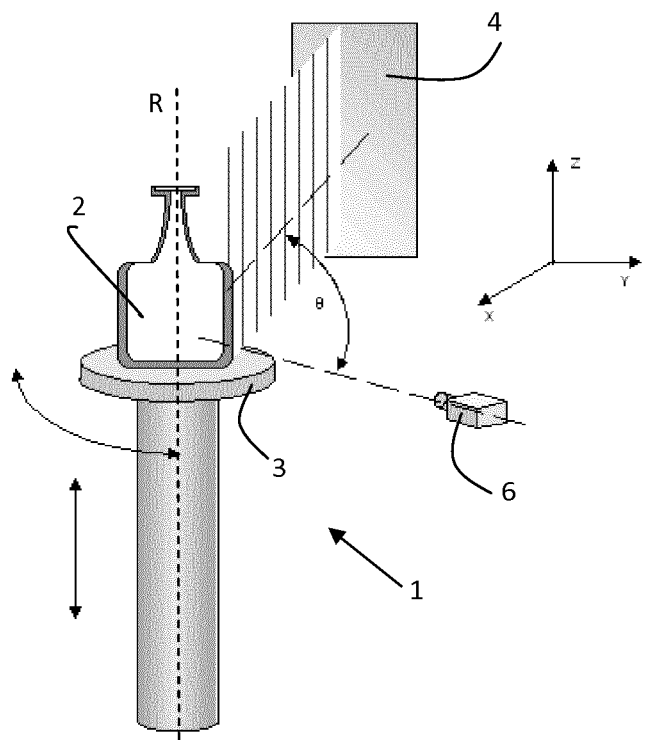
FIG. 2 shows a first embodiment of the checking system according to the invention.

FIG. 2 shows a glass container 2 having rotational symmetry which is largely cylindrical, more particularly a bottle, positioned on a support 3 rotating about an axis of rotation R parallel to the direction Z. The container 2 defines a longitudinal axis, which is positioned substantially on the axis of rotation of the support and comprises a first surface, that is to say the outer surface of the container, and a second surface opposed to the first, that is to say the inner surface of the container. The support 3 on which the container rests can also be translated in the direction Z. The container may be positioned either manually or by means of an automatic system.

A light emitter 4, or light source, emits a light blade (shown schematically in the figure as a series of vertical lines) towards the axis of rotation of the support, that is to say substantially coplanar with the axis of rotation R. The emitted light blade defines a plane of illumination which is substantially perpendicular to the first surface of the bottle to be checked. This first surface faces the light source 4. According to a preferred embodiment, the light source 4 emits a structured light, preferably a laser light blade. The characteristics of the emitted light may be selected in an appropriate way; in particular, the colour may be blue, in other words with a small wavelength, to provide a sharpened scattering effect on the checked surfaces.

A receiver, or video camera, comprising a sensor 6, preferably of the matrix type, which defines an optical axis and can receive the rays scattered from the surface to be checked, is positioned so as to be orientated towards the axis of rotation of the support 3 and spaced apart angularly from the light source 4. In other words, the sensor 6 is positioned facing the surface to be checked so as to form a specified angle, indicated in the figure by the reference 8, with the plane of illumination. This angle is between 45° and 85°. The aforesaid range has been determined empirically on the basis of tests conducted on a plurality of transparent objects having different characteristics.

The sensor 6 emits an electrical signal as a function of the quantity of light received by the sensor and sends such signal to a processing unit, connected to the sensor 6 and comprising, for example, a microprocessor, of a known type which is not shown in the figure, which generates orderable images of a plurality of light traces created by the incidence of the light blade on the inner and outer surfaces of the container 2. During the mutual rotation between the checking system and the container 2 the light blade strikes against the surfaces of the container 2 at angularly spaced positions (for example spaced by 1°) and each image is associated with one of said positions.

The images collected are stored (either in RAM or on a hardware medium such as an HDD or SSD or equivalent) and are then processed by the processing unit.

After the processing of the images, a map providing a graphic representation of the positive deviations, such as projections, or negative deviations, such as hollows, of the surface shape from a reference surface is displayed, on a display connected to the processing unit for example.

In other words, the trend of the profile of the scanned surface is calculated from the combination of the elementary information contained in the images generated on the basis of the signal provided by the sensor 6. The complete analysis of the images relating to the whole surface of the container 2 also makes it possible to obtain data suitable for reconstructing the spatial shape of the object.

It is also possible to obtain data on the morphology or topology of the container by using ancillary or external systems such as optical systems, or on the basis of drawings, or by using appropriate mathematics (drawings, 3D models) in the form of files.

The checking system may also comprise electronically controlled mechanical systems for positioning the container and the various components of the checking system, such as the light source and the video camera.

The system described up to this point implements a checking method according to the invention which provides, as described above, for emitting by means of the light source 4 a light blade which defines a plane of illumination substantially perpendicular to the outer surface of the container 2 to be checked and for positioning the sensor 6 facing this outer surface so that the optical axis of the sensor 6 forms a specified angle θ, preferably between 45° and 85°, with the plane of illumination. The method also provides for detecting, among a plurality of rays scattered by the outer and inner surface of the container 2 when they are struck by the light blade, the scattered rays received at the optical axis of the sensor 6, and for generating, on the basis of the detected scattered rays, a plurality of traces corresponding to the profiles of the surfaces of the container 2, including both the inner and the outer surface. The term "trace" is taken to mean a set of points corresponding to the points on the surface struck by the light blade which indicate the trend of this surface.

The plurality of generated traces constructs an image of the container 2, comprising the profiles of its surfaces and having an orientation that is known and correlated with the spatial positioning of the object. The profile of at least one of the outer surface and inner surface of the container is associated with one of the generated traces, which lies in a predetermined position relative to the other generated traces.

In the preferred embodiment, the profile of the first surface, in other words that of the outer surface of the container 2 illuminated by the light blade, corresponds to a first trace, among the plurality of detected traces, which lies in an end position relative to the other traces, and the profile of the second surface, in other words that of the inner surface of the container, corresponds to a second trace adjacent to the first trace which is associated with the profile of the outer surface.

The aforementioned range of angular values relating to the mutual positioning of the sensor and the plane of illumination makes it possible to obtain traces, especially the first trace and the second trace, which are clearly distinct from one another and are therefore easily identifiable. It also makes it possible to reduce the interferences potentially caused by multiple reflections which are typically generated in this type of check, and which might interfere with the application of the method according to the invention.

The steps of the method according to the invention may be repeated at different angular positions of the container 2, during the mutual rotation between the checking system and the container 2, until at least one surface or a specified area thereof has been checked.

The method is described below with reference to the embodiments illustrated in the figures.

Figure 3:
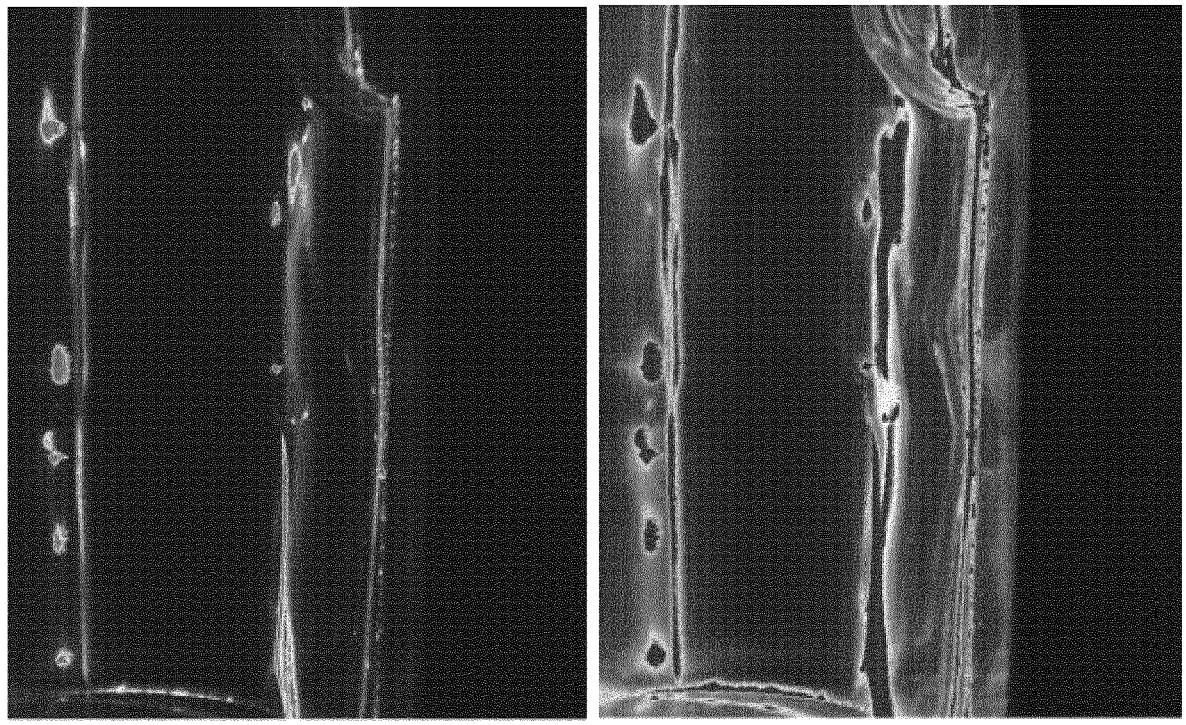
FIG. 3 shows two different grey scale images of a container produced by means of a system according to the invention.

FIG. 3 shows two images of the bottle struck by the light blade, obtained from a grey level image with a bit depth of 14 by multiplying the grey value of each pixel by two different values of intensification; the areas having the lighter colour indicate that the maximum value (saturation) has been reached. In the right-hand image, intensified 20×, the profile of the bottle is easily distinguished from the darker background. Because of the transparency of the material, the light rays are propagated into the bottle and, at any air/glass interface (in other words, any surface of the container, also referred to hereafter as a "face") crossed along its path, not only a trace is generated, but each light ray is also split into a transmitted and a reflected ray, each of which continues to be propagated and to split. The end result is the appearance of a large number of traces.

The method according to the invention enables a criterion to be established to identifying the traces that are useful for the purposes of checking, while overcoming the difficulties of the known methods.

Unlike the known methods which make use of the optical phenomenon of reflection, the method according to the invention makes use of the phenomenon of optical scattering, also called optical dispersion, without the need to apply means (such as micropowders) to the surface to be checked in order to increase the brightness of the point or portion of the surface to be checked. This is possible because of the particular mutual positioning of the light source and video camera, which enables the irregularities typical of the material forming the surface to be checked to be used for identifying in a unique manner the rays scattered from the surface(s) to be checked and received by the video camera which are useful for the purposes of checking.

The appropriate positioning of the video camera and thus of the sensor 6 ensures that the video camera and thus the sensor 6 receives at its optical axis only those scattered rays that are useful for the purposes of checking. By using a lens with a suitable aperture, and positioning the video camera at an appropriate height relative to the longitudinal axis of the container 2, it is possible for the video camera to reconstruct the profile of the whole surface to be checked, or more particularly, in the embodiment described, the profile of the whole generatrix of the container 2 struck by the light blade. Thus, by means of a single scan of the surface to be checked, the profile of this surface can be determined. If the surface to be checked has an extension in the direction Z that is larger than the field of view of the video camera, it is possible to perform a first check, then move the support 3 in the direction Z shown in FIG. 2, and perform one or more further scans so that the whole surface is checked.

Using the method according to the invention, it is possible to establish a criterion for identifying the trace relating to the first face struck by the light blade, in other words the surface to be checked facing the light source. The images in FIG. 3 relate to a positioning of the light source to the right of the container, and are orientated in a corresponding manner. In this example, the first trace, corresponding to the outer surface facing the light source, is the first in an order starting from the right. It is followed by a second trace, almost parallel to the first, corresponding to the opposite surface, that is the one not facing the light source (in this case, where a container is involved, this surface corresponds to the inner surface of the bottle). These are the two traces of interest; all the others are to be disregarded. The method according to the invention thus makes it possible to establish that the trace to be associated with the first face of the object crossed by the emitted light blade is the face closest to the light source.

The correct and effective discrimination of the traces, and therefore the effectiveness of the method, is achieved, as mentioned above, by an appropriate mutual positioning of the light source and video camera, aimed at maximizing the separation of the traces, an appropriate selection of the characteristics of the light source (intensity, width, and colour of the light blade), and an effect of scattering of the incident light generated by the surface of the object to be checked. When the trace corresponding to the first face has been identified, the reconstruction of the shape of the outer surface, or more generally the surface closer to the light source, may be carried out in a conventional way, in other words as if the object were opaque, according to the optical triangulation method which is known and is not described in detail here.

If the object to be checked has a hollow shape and has a very small thickness relative to the dimensions of the object itself, or if the object has a flat shape, the method according to the invention may be used to establish a second criterion: among the plurality of generated traces, the second trace, i.e. the trace immediately following, in other words adjacent to, the first trace, i.e. adjacent to the trace relating to the first face of the object, corresponds to the second face of the object to be checked, opposite the first.

In this case, it is possible to determine the thickness of the object to be checked, more specifically, and as explained for example hereinbelow, the thickness of the object can be calculated as a function of the distance between such first and second traces. In fact, the points on the opposite surface, that is the one not facing the light source (in the case of a container, this surface corresponds to its inner surface) struck by the light blade that has passed through the surface facing the light source (in the case of a container this surface corresponds to its outer surface) act as point light sources. For each of these, of all the scattered rays, the video camera receives only the one that, having passed through the surface facing the light source, is directed towards the lens centre of the video camera.

The principle described above is shown schematically in FIG. 4, where a glass plate is seen, the plate being shown schematically as a rectangle, which a light ray strikes perpendicularly. The observer (corresponding to the video camera) is assumed to be at an infinite distance (that is to say, located at an observation distance that is much greater than the thickness of the glass), and observes the plate from an angle θ with respect to the light ray. To ensure that the ray arriving from the second interface, in other words from the left side of the rectangle as orientated in the figure, when in the air, in other words when scattered from the first interface, corresponding to the right side of the rectangle as orientated in the figure, is parallel to that relating to the first interface, the angle of emission $\theta_1$ in the glass must satisfy the following law of refraction:

$$n_0 \sin(\theta) = n_1 \sin(\theta_1),$$

where $n_0$ and $n_1$ are the refractive indices of air and glass; the refractive index of air $n_0$ may be taken to be 1.

Figure 4:
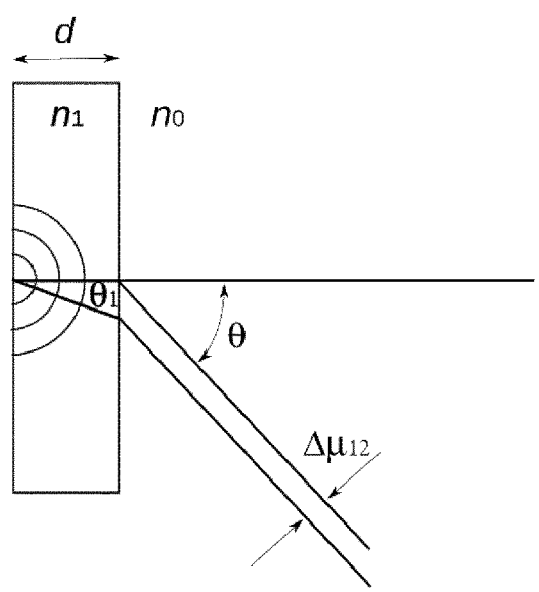
FIG. 4 shows a layout relating to checking the thickness of a container which implements the method according to the invention.

Looking at FIG. 4, it will be readily seen that the apparent distance between the two traces $$\Delta\mu_{12} = (\mu_1 - \mu_2) * p^2 m$$

is related to the thickness of the glass according to the relation $$\Delta\mu_{12} = d \tan(\theta_1)\cos(\theta),$$

and therefore $$d = \frac{\Delta\mu_{12}}{\tan(\theta_1)\cos(\theta)}$$

The result is entirely independent of whether or not the two interfaces are parallel; however, it is affected by any curvature of the first interface occurring between the point of incidence of the ray and the point of exit of the ray generated by the second interface, but, since these points are very close together relative to the radius of curvature of the first interface, this effect is weak.

The two-dimensional processing described above may easily be implemented in 3D when the shape of the outer surface has been determined.

As a general rule, the detected traces may have discontinuities in the areas in which sampling is not feasible, due to defects in the material for example. The detected traces are processed mathematically, making it possible, assuming that the material is continuous (without cracks), to estimate, by interpolation from the data acquired by the system, the shape of the surface of the object and its thickness, including in areas where the sampling density is lower.

Although it is not necessary for the application of the method according to the invention, in order to reduce the possible effect of optical reflections/disturbances unrelated to the characteristics to be detected, it is possible to use, as is the case in known systems, means for increasing the contrast, and thus improving the sampling, of the profile highlighted by the light source in the transition area. The contrast increasing system may be configured as a small injection of appropriate gases containing atomized synthetic resins, either single or combined, or micropowders. This system may be useful, in particular, in the case of measurements on glass objects having very high transparency and a particularly fine inner surface finish. The aim of the contrast increasing system is substantially to maximize the amount of sampled data, by generating further scattering point sources.

The method according to the invention makes it possible to approximate faithfully in a single scan the profile of the surface facing the light source and, according to the alternative embodiment, also the profile of the opposite surface, that is the one not facing the light source. If the checking method is applied to a container, the profiles of these surfaces correspond to the outer profile and the inner profile of the container. The checking and/or measurement process, which may extend to the whole surface to be checked or to a part thereof, covers a large number of points and positions measured in a very short time by comparison with the known methods. The method thus allows the surface to be scanned continuously, instead of discretely, in other words point by point, as is the case in the known methods, the continuity of the scanning being limited only by the resolution of the sensors used and the acquisition speed.

In the system and method described up to this point it is the container that is made to rotate relative to the checking system. However, it is possible to design the system in such a way that the container is stationary and the relative movement between the object to be checked and the checking system is provided by moving the checking system itself.

Figure 1:
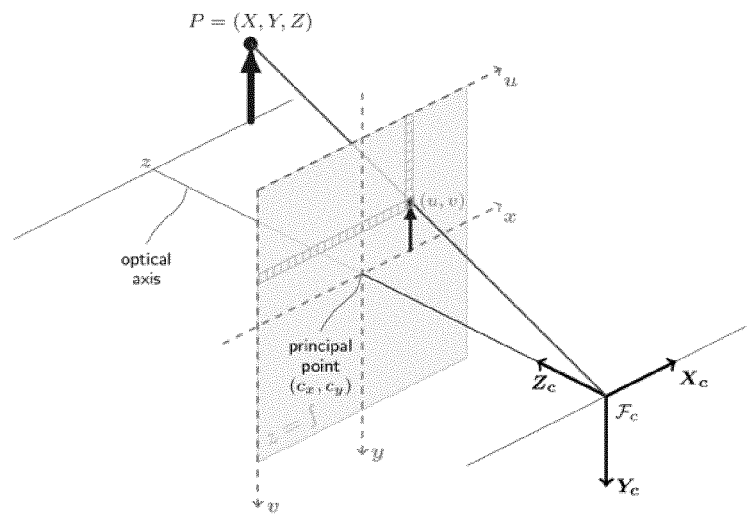
FIG. 1 shows in a highly simplified way a pinhole model of a video camera of a known type.

The relative movement between the object to be checked and the checking system may be provided in different ways from that shown in FIG. 1, some of these ways being illustrated by way of example in the following description.

The systems for positioning the container and the light source described below enable a relative movement to be created between the container and the light source, such that the incidence of the light emitted by the light source on the surface of the container is kept substantially orthogonal.

Figure 5:
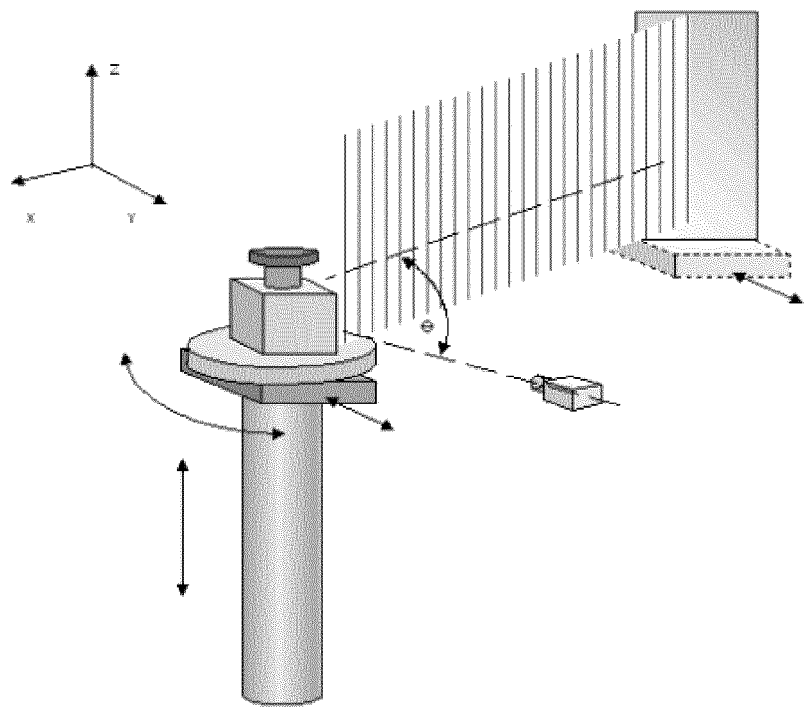
FIG. 5 shows a first alternative embodiment of a checking system according to the invention.

FIG. 5 shows an alternative embodiment in which the direction of emission of the light source is indicated by the reference X. The container, with a parallelepipedal portion to be checked, is placed on a support capable of rotation and translation in two directions orthogonal to one another. The container defines a longitudinal axis which is positioned at the axis of rotation of the support. On the basis of data relating to the shape of the container, obtained from other ancillary acquisition systems (optical or mechanical) of the system, the container is rotated until the dimension to be checked becomes parallel to the direction Y that is normal to X. The system is capable of translating the container in a direction parallel to Y, for the purpose of checking the shape and thickness of the dimension parallel to Y.

Alternatively, in other configurations, the light source can be translated in the direction parallel to Y to scan the dimension to be checked parallel to Y.

Figure 6:
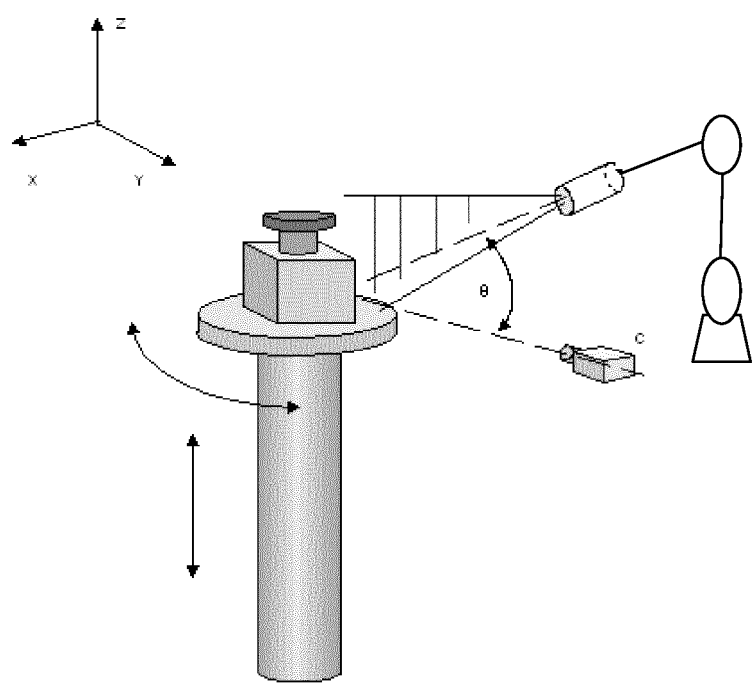
FIG. 6 shows a second alternative embodiment of a checking system according to the invention.

In FIG. 6, which shows a further alternative embodiment, the system comprises a device for positioning the container, a multi-axis system (e.g. an industrial robot allowing 3D movements, shown in a very schematic way) with a control unit, a light source emitting structured light (a laser, for example) and a video camera.

The device for positioning the container may perform at least one rotation, as well as a translation parallel to Z.

On the basis of data relating to the morphology of the container and to the topology of its surface, the positioning device orientates the container appropriately relative to a direction Y. The multi-axis system connected mechanically to the light source moves the latter by translation parallel to Y, maintaining the emission of the light source parallel to X.

The video camera acquires the images, and, by appropriate processing, reconstructs the shape of the profile of the width of the container parallel to the Y axis and the thickness of the container relative to said profile.

Figure 7:
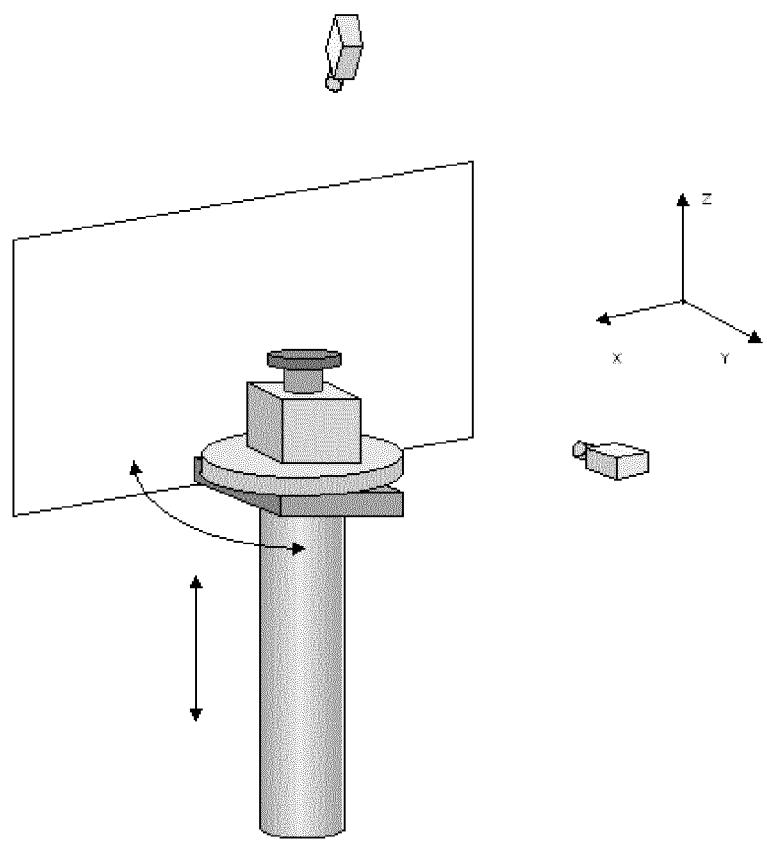
FIG. 7 shows a third alternative embodiment of a checking system according to the invention.

FIG. 7 shows in a simplified way configurations of the ancillary systems for generating morphological and topological data about the container.

These ancillary systems may consist of video cameras with appropriate illumination devices for capturing at least one image from above the container or laterally with respect to it, enabling information to be obtained on the morphology of the container and on the topology of the surface of the container.

The systems for positioning the container and the light source enable a relative movement to be created between the container and the light source, such that the incidence of the light emitted by the light source on the surface of the container is kept orthogonal to the surface of the container or close to orthogonal. During this relative movement, controlled by control systems, a plurality of orderable images are acquired and generated through a video camera. From the combination of the elementary information contained in the images, the trend of the profile of the scanned surface is calculated, and measurements of the thickness of the wall of the container over the whole surface or a portion thereof are obtained. The complete analysis of the images covering the whole surface (envelope) of the container also makes it possible to obtain data suitable for reconstructing the spatial shape of the object.

If the method according to the invention is applied to objects made of dark-coloured transparent material, the emission power of the light source may be appropriately modulated to facilitate the identification of the trace corresponding to the second surface to be checked.

In general, in the case of objects made of particular transparent material it may be difficult to discriminate the two traces corresponding to the outer surface and the inner surface of the object to be checked. Indeed one of the two traces may prevail over the other thus complicating the correct identification of the desired trace. To overcome the problem, it would be necessary to extend the exposure times or set very low recognition thresholds risking that noises or false signals are generated or that not all the data contained in the collected images can be considered and processed.

To facilitate the identification of the traces, it is possible to use a light source emitting polarized laser light and a video camera equipped with appropriate filters, such as an interference filter (a bandpass filter for example, so that the sensor receives only the frequencies corresponding to the laser light emitted by the light source) and a polarizing filter.

After having implemented the method according to the present invention to identify the traces corresponding to the inner surface and the outer surface of the object to be checked, further images are acquired as described hereinafter.

By setting the polarizing filter of the video camera in such a way that the polarization angle is shifted by 90° with respect to the polarization angle of the laser light source, the first trace corresponding to the outer surface of the object is completely absent in the further collected images. Such images thus contain just the second trace corresponding to the inner surface of the object.

By subtracting the images containing just the second trace from the images that were previously collected that contain both the traces, it is possible to obtain images with just the first trace corresponding to the outer surface of the object. It is pointed out that the images containing both the traces may be collected by setting, for example, the angle of polarization of the polarizing filter in phase with the polarization angle of the laser light source.

This process is repeated for each angularly spaced positions at which the light blade straikes against the surface of the container 2, during the mutual rotation between the checking system and the container 2.

Obtaining images with a single trace enables to further processing such images (by applying, for example, more "extreme" processing methods allowing to render the trace more clear) without introducing noises or other interferences which may affect the discrimination of the traces.

This is advantageous to check not only the surface of an object but also the thickness of an object because the measurement of its thickness is by far simplified.

The collection of single images as described above is particularly facilitated by the use of recent models of video camera which thanks to functionalities of the sensor and the software of the video camera itself and changing the polarization automatically processes the image originally collected during the implementation of the method according to the invention, that is to say the image containing both the traces, to obtain an image containing a single trace, without taking a further image after the polarization angle has been shifted.

The invention claimed is:

1. A method for checking an object made of a transparent material defining at least a first surface and a second surface, which delimit a thickness, by means of a checking system comprising a light source, a sensor defining an optical axis and a processing unit connected to said sensor, the method comprising the following steps, not necessarily in that order:
   emitting, by means of the light source, a light blade defining a plane of illumination substantially perpendicular to said first surface,
   positioning said sensor facing said first surface in such a way that the optical axis forms a specified angle with the plane of illumination,
   detecting, among a plurality of rays scattered by said at least a first surface and a second surface, the scattered rays that are received at the optical axis of the sensor,
   generating, on the basis of the detected scattered rays, a plurality of light traces corresponding to the profiles of said at least a first surface and a second surface, and
   associating the profile of one of said at least a first surface and a second surface to a trace which lies in a predetermined position with respect to the other traces.

2. The method according to claim 1, wherein the profile of said first surface of the object is associated to a first trace lying at an end position with respect to the other traces of said plurality.

3. The method according to claim 2, wherein the profile of said second surface of the object is associated to a second trace adjacent to said first trace.

4. The method according to claim 3, including the further step of calculating the thickness of the object as a function of the distance between said first trace and second trace.

5. The method according to claim 1, wherein the angle between the optical axis of the sensor and the plane of illumination is comprised between 45° and 85°.

6. The method according to claim 1, wherein at least one of said first surface and second surface of the object is a curved surface.

7. The method according to claim 1, wherein the object to be checked is a container, said first surface and second surface corresponding to the outer surface and the inner surface of the container, respectively.

8. The method according to claim 7, wherein said first surface is in an area of the container where a label is attached.

9. A checking system for checking an object made of a transparent material defining at least a first surface and a second surface, which delimit a thickness, the system comprising:
   a light source,
   a sensor defining an optical axis, and
   a processing unit connected to said sensor,
   wherein
   the light source emits a light blade that defines a plane of illumination substantially perpendicular to said first surface; and
   the sensor is positioned facing said first surface in such a way that the optical axis forms a defined angle with the plane of illumination, receives and detects, at said optical axis, rays scattered by said at least a first surface and a second surface and send an electric signal,
   the processing unit being adapted to generate, on the basis of the detected scattered rays, images of a plurality of light traces corresponding to the profiles of said at least a first surface and a second surface, and to associate the profile of one of said at least a first surface and a second surface to a trace which lies in a predetermined position with respect to the other traces.

10. The system according to claim 9, wherein the light source emits a laser light.

11. The system according to claim 9, wherein the light emitted by the light source is a structured light.

12. The system according to claim 9, wherein the light emitted by the light source can be modulated.

13. The system according to claim 9, wherein the angle between the optical axis of the sensor and the plane of illumination is comprised between 45° and 85°.

14. The system according to claim 9, wherein the processing unit is adapted to associate the profile of said first surface of the object to a first trace lying at an end position with respect to the other traces of said plurality.

15. The system according to claim 14, wherein the processing unit is adapted to associate the profile of said second surface of the object to a second trace adjacent to said first trace.

16. The system according to claim 15, wherein the processing unit is adapted to calculate the thickness of the object as a function of the distance between said first trace and second trace.

* * * * *